June 10, 1930. G. W. HEBBELER 1,762,227
TIRE CASING EXPANDER
Filed June 21, 1928
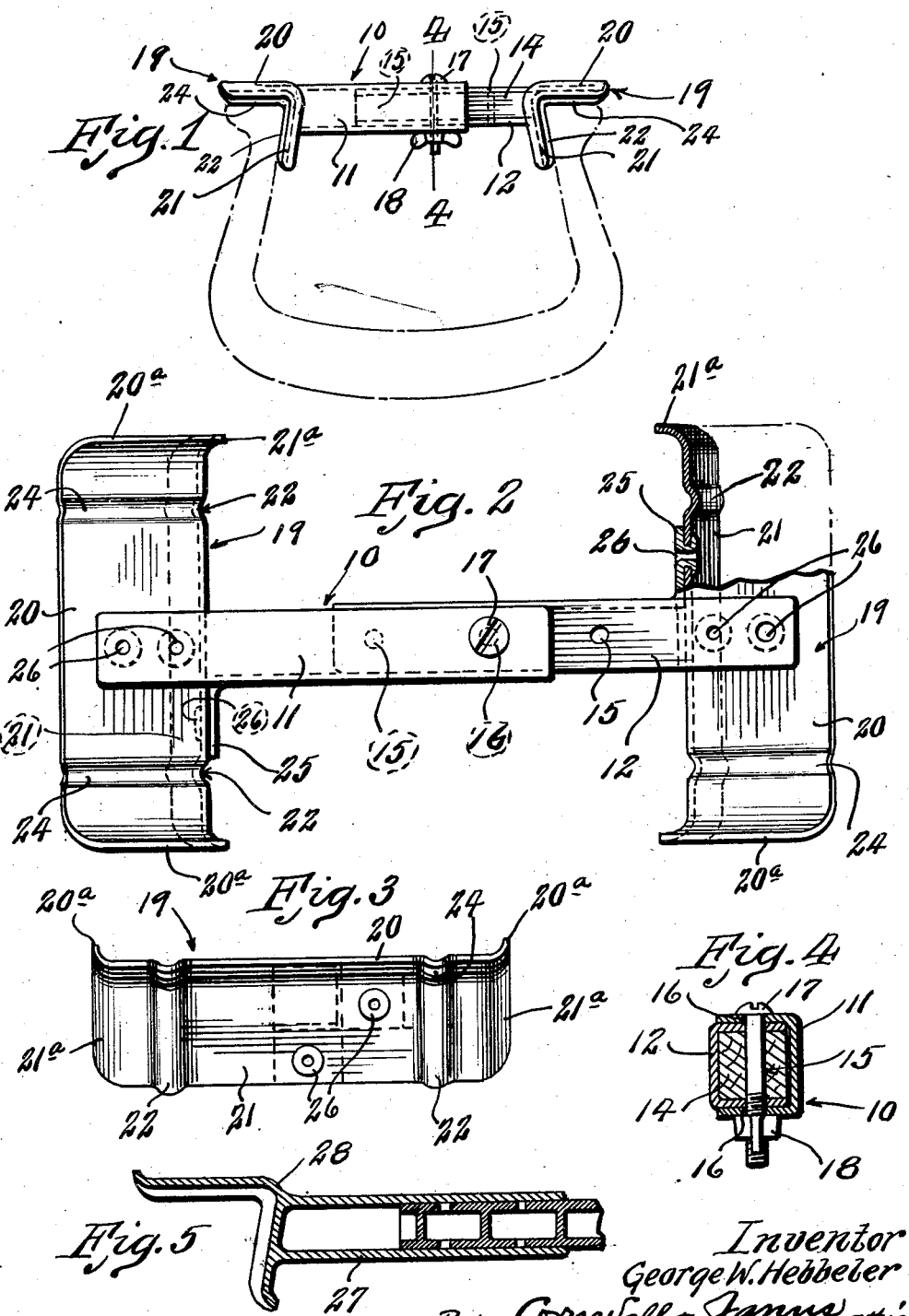
Inventor
George W. Hebbeler
By Cornwall & Jannus Atty's Patented June 10, 1930

1,762,227

UNITED STATES PATENT OFFICE

GEORGE W. HEBBELER, OF ST. LOUIS, MISSOURI

TIRE-CASING EXPANDER

Application filed June 21, 1928. Serial No. 287,080.

This invention relates to new and useful improvements in tire casing expanders.

It is a primary object of the present invention to provide a tool which can be inserted in position to expand the casing so that one man can handle the tire conveniently without any other assistance and make the necessary repairs or inspection.

Other objects of the invention are to provide a tire casing expander which is adjustable for use with different sized casings and which is held securely in position in the casing whereby all danger of the expander becoming displaced and the edges of the casing closing together while the user is working on the casing is thereby eliminated.

Further objects are to provide a tool of the class described which is of simple construction, can be readily used by an inexperienced person, is efficient in performing its intended functions, and which can be manufactured at low cost, out of standard material.

With these and other objects in view, my invention consists in certain novel features of construction and arrangement of parts, hereinafter more fully described and claimed, and illustrated in the accompanying drawings, in which—

Figure 1 is a side elevational view of the expander showing it applied to a casing, which latter is shown in dotted lines.

Figure 2 is an enlarged top plan view of the expander.

Figure 3 is an end elevational view.

Figure 4 is a vertical cross section taken on line 4—4 of Figure 1.

Figure 5 is a sectional detail view of a modified form of my expander.

Briefly, the invention consists of a member insertable transversely within the tire casing with the ends of the member bearing against the beaded edges of the casing so as to hold the latter in expanded position. The ends of the expander are enlarged and so flanged as to more readily engage the edges and support the member in position and hold it against collapsing under the pressure exerted by the expanded casing.

Preferably the member is adjustable longitudinally so as to adapt it to casings of different sizes.

Referring by numerals to the accompanying drawings, 10 indicates a body portion which, in the present instance, consists of two sections 11 and 12, respectively, having telescoping relation with each other so as to vary the length of said member 10. Both of said sections are preferably formed of sheet metal, formed channel-shaped in cross section, section 12 being of smaller dimensions so as to slide within section 11. This section 12 is provided with a filler block 14, preferably made of wood, of same cross sectional area as the inside dimensions of channel 12. The purpose of this filler is to reinforce the horizontal flanges of the sections when undue pressure is applied thereto. Section 12 is provided with a series of vertically disposed spaced-apart apertures 15 which extend through filler 14 and the horizontal flanges of section 11 are provided with coaxially aligned apertures 16 which are adapted to be aligned with any one of said apertures 15 so that a screw or pin 17 can be inserted therethrough and lock said sections in adjusted position.

The projecting end of screw 17 receives a wing nut 18 which can be drawn against the horizontal flange of section 11 and hold said screw against displacement.

There are three apertures 15 formed in section 12. Consequently three adjustments of the expander can be obtained. However, by increasing the number of apertures a greater range of adjustment can be had.

The outer ends of sections 11 and 12 are each provided with an enlarged end member 19 which is disposed transversely to the longitudinal axis of portion 10. Each end member is preferably formed angular in cross section having a horizontally and forwardly disposed flange 20 and a depending flange 21, which latter is disposed adjacent to body portion 10. These depending flanges are preferably inclined from vertical so as to more nearly correspond to the inclination of the inner walls of a tire casing when the expander is inserted in position between the beaded edges of the casing, while the horizontally disposed flanges 20 rest on the tops of said edges.

End members 19 are of sufficient length so as to provide a comparatively large surface engagement between said ends and the edges of the casing and prevent the accidental displacement of the expander under the pressure exerted thereagainst by the casing.

The edges of flanges 20 are slightly curved upwardly as indicated at 20ª and the end edges of flanges 21 are curved rearwardly as indicated at 21ª in order to facilitate the shifting of the expander in the casing and prevent the biting of the edges of said flanges into the casing. Each flange 21 is provided a suitable distance to each side of the longitudinal axis of the expander with a transversely disposed rib or shoulder 22 which is curved transversely and is presented outwardly against the inner face of the casing, and similar ribs 24 are formed in the underside of each flange 20 and bear against the upper face of the casing. Ribs 24 are preferably in alignment with ribs 22 and are, in fact, continuations thereof.

When the device is formed of sheet metal, as in the instant case, said ribs are formed by indentation. The purpose of these ribs is to provide suitable bearing faces between the end members 19 and the tire casing, thereby eliminating unnecessary surface contact between the flanges 20 and 21 and the casing, and thus reducing the friction and facilitating the shifting of the expander.

In the form shown in Figures 1 to 4, sections 11 and 12 are formed separate from end pieces 19 and are secured thereto in any suitable manner, as for instance, by cutting the ends of the web portions of said sections and bending said ends at right angles as indicated at 25 so that said ends bear against the depending flanges 21. The ends of the top flange are left straight and overlie the horizontal flanges 20 and are secured thereto, while the ends of the bottom flanges of sections 11 and 12 can be bent downwardly and secured to depending flanges 21.

The preferable method of securing the end portions of sections 11 and 12 to the end pieces 19 consists in stamping out tubular rivets or projections in said end portions, passing said rivets through apertures formed in the appropriate flanges, and then bending the projecting ends of said rivets or projections thereagainst as indicated at 26. In this manner, the constituent parts of the expander can be stamped and secured together in an efficient manner, thereby providing a tool of rugged construction in an economical manner.

In the modified form shown in Figure 5, each channel section 27 is cast integral with the end piece 28 and as the channel members are formed of casting, no filler is required in the inner member.

In working on the casing, any number of expanders can be used. Where it is desired to expand the whole casing three or four expanders spaced equidistant in the casing will be found sufficient. However, in working on one spot only, two expanders, one on each side, can be used. The expander is held in position by the tension produced by expanding the casing. The depending flanges 21 provide ample surface contact with the edges of the casing not only to prevent displacement of the expander but also to receive sufficient pressure to hold the expander in position, when the expander occupies reversed position, as, for instance, when inserted in the upper half of a casing which is held in vertical position.

My improved expander is light in weight and occupies very little space, so that it may be carried conveniently with the other tire tools.

While I have described and shown the preferred form of my invention, it is to be understood that various changes in the construction and arrangement of parts of my expander can be made, without departing from the spirit of my invention.

I claim:

A tire expander comprising in combination a pair of sections channel shaped in cross section and arranged in opposed relation with the flanges disposed in juxtaposed relation and provided with a series of equidistant spaced apertures, a pin insertable through the aligned apertures for securing said sections in adjusted positions, a transversely disposed angle member secured to the outer end of each section with a vertically disposed flange arranged against the deflected ends of the flange and web portion of the corresponding section, and with a horizontally disposed flange of said angle member arranged against the underside of the end of the upper flange of said section, and means for attaching the flanges of the angle member to the ends of the corresponding section, the end edges of each angle member being curved outwardly to present rounded surfaces to the annular edges of the tire.

In testimony whereof I hereunto affix my signature this 13th day of June, 1928.

GEORGE W. HEBBELER.